Jan. 31, 1939.　　　L. D. HOULIS　　　2,145,482
BAKING OVEN
Filed March 20, 1937　　4 Sheets-Sheet 1

INVENTOR
Louis D. Houlis
BY
ATTORNEY

Jan. 31, 1939.  L. D. HOULIS  2,145,482
BAKING OVEN
Filed March 20, 1937   4 Sheets-Sheet 3

INVENTOR
LOUIS D. HOULIS
BY
ATTORNEY

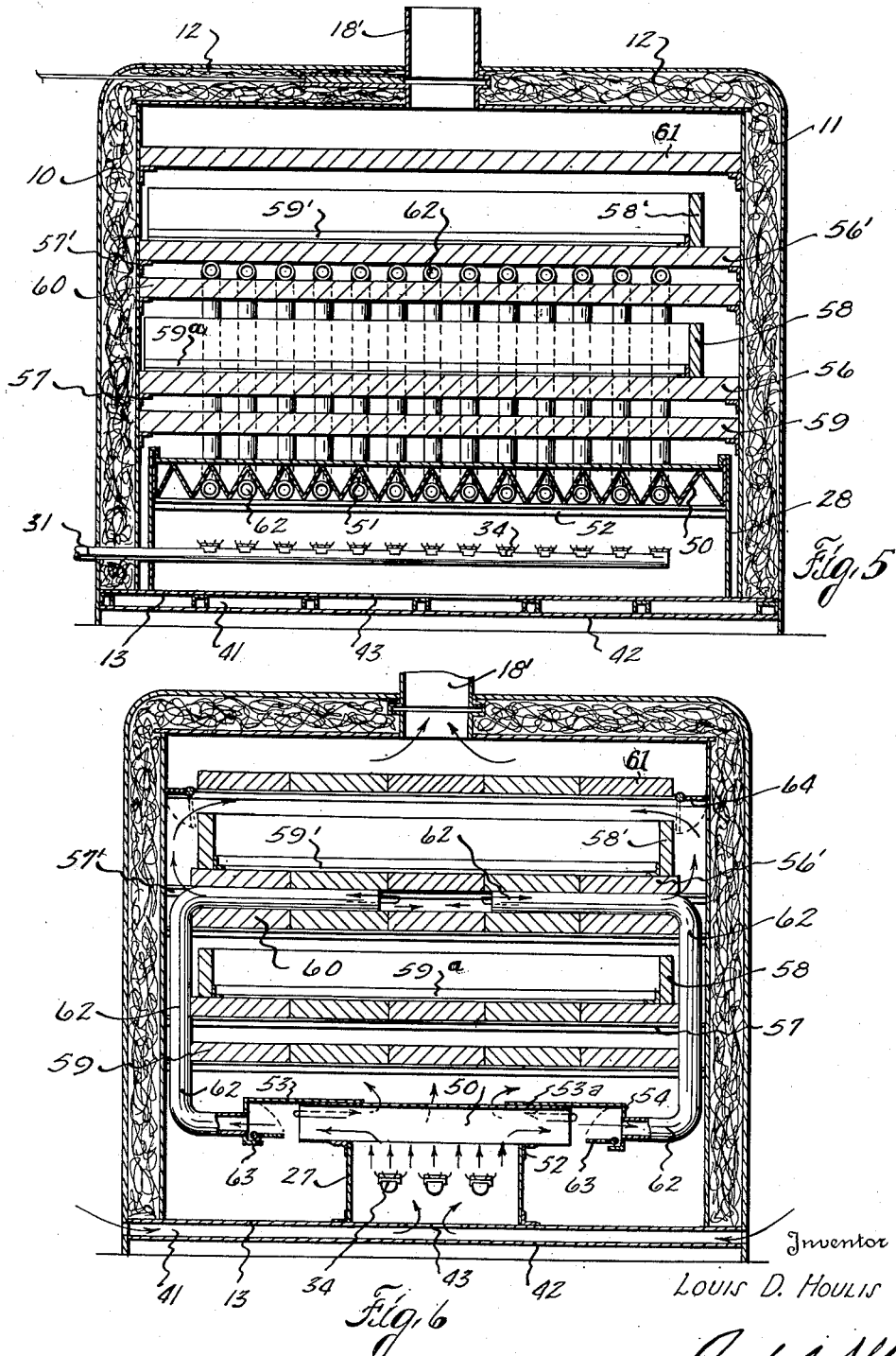

Patented Jan. 31, 1939

2,145,482

UNITED STATES PATENT OFFICE 2,145,482

BAKING OVEN

Louis D. Houlis, Cincinnati, Ohio

Application March 20, 1937, Serial No. 132,075

16 Claims. (Cl. 107—59)

This invention relates to new and useful improvements in baking ovens.

One object of the invention is to provide an improved baking oven generally used for baking bread, pies, cakes and other bakery products, and which may be of the revolving tray or the stationary deck type.

An important object of the invention is to provide a baking oven having an improved fire box which is so constructed that large quantities of steam may be introduced into the baking chamber during the baking of hearth breads and other products without interfering or affecting the flame of the burners in said firebox, whereby the efficiency of the oven is maintained under all conditions.

Another object of the invention is to provide an improved baking oven wherein a series of overhanging baffles are disposed over the burners of the firebox and are arranged so as to distribtue the heat evenly and uniformly throughout the baking chamber thereby increasing the efficiency of the oven; said baffles not only providing for even distribution of heat but also being constructed to provide an increased radiating surface and located so that the heat is radiated therefrom in all directions within the baking chamber.

Still another object of the invention is to provide an improved baking oven having a semi-indirect firing system and also having means for automatically controlling the air supply to the burners of said system, whereby the burners are at all times supplied with fresh air, which results not only in more efficient heating but also in a reduction in escape of heat from the baking chamber when the door thereof is opened to remove or insert baking products therein; such control of the air supply being in accordance with the fuel supplied to the burners, whereby said air is supplied as needed.

A further object of the invention is to provide an improved baking oven having means for conducting the heat upwardly from the burners at the lower end of the oven to the upper end of the chamber to assure a uniform heat throughout said chamber; together with means permitting escape of the heat when it is not desirable to confine the same at the upper end of said chamber.

A construction designed to carry out the invention will be hereinafter described, together with other features of the invention.

The invention will be more readily understood from a reading of the following specification and by reference to the accompanying drawings, in which an example of the invention is shown, and wherein:

Figure 5 is a longitudinal, sectional view of a modified form of the invention; and Figure 6 is a transverse, vertical sectional view of the same.

Figure 1:
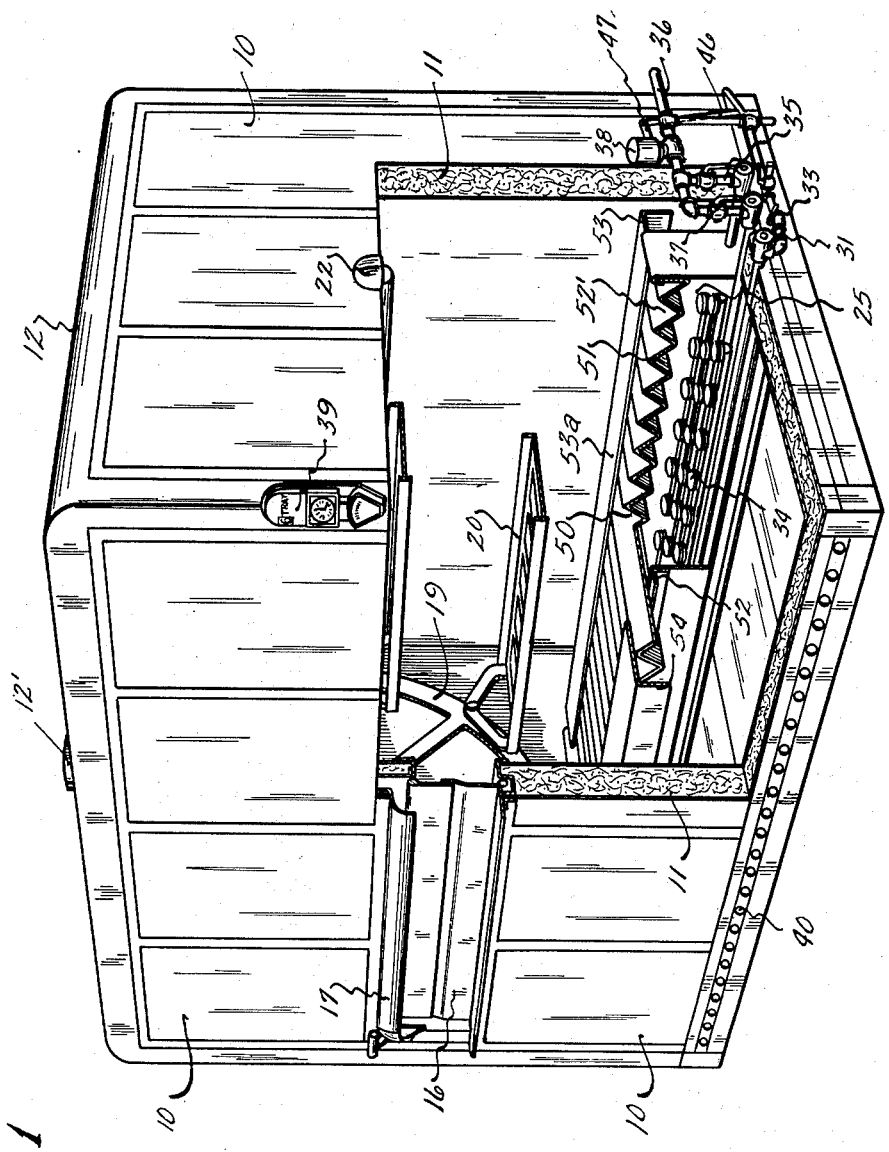
Figure 1 is a perspective view of a baking oven, constructed in accordance with the invention and having a portion of its wall broken away to show the interior thereof.

In the drawings, the numeral 10 designates a casing or housing of a baking oven which is shown as substantially rectangular in cross-section but which may be any desired shape or size. The walls 11 and top 12 are suitably insulated in any desired manner as is the bottom 13. The casing rests on an angular base member 14, whereby the underside of the bottom 13 is spaced from the floor or other support. The vertical flange 14' of the base member completely encloses this space as is clearly shown in Figures 1 and 2.

A baking chamber 15 is formed within the oven and a door 16 in the front wall of the casing permits access thereto. A longitudinal hood 17 extends over the door and directs heat escaping therefrom, when said door is open, upwardly through a vertical outlet flue 18. The upper end of the flue may be open to the atmosphere, or may have a suitable conductor connected thereto.

Figure 2:
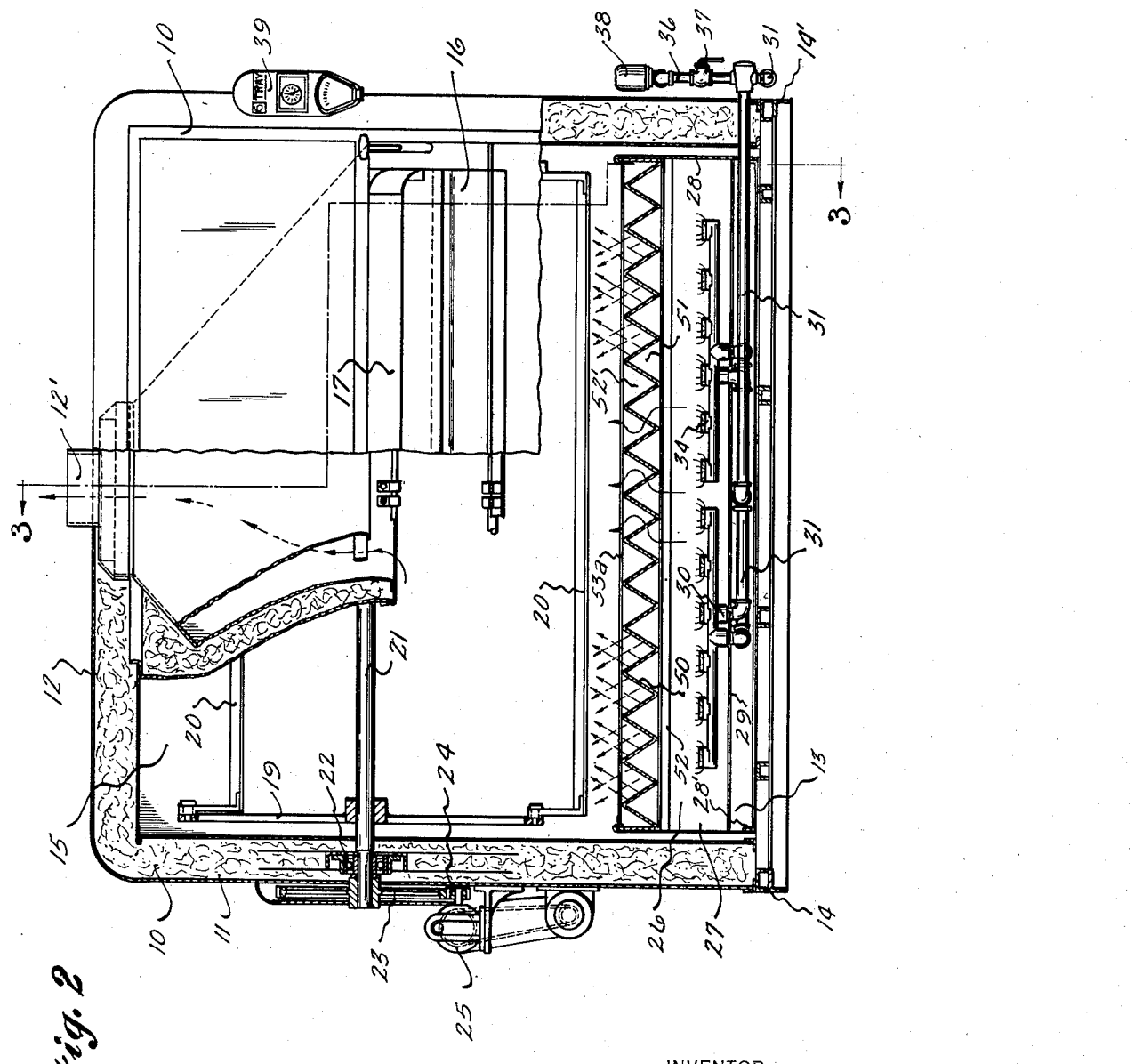
Figure 2 is a view partly in section and partly in elevation of the oven.

A rotatable reel 19, having a plurality of supporting trays 20 pivoted thereto, is mounted on a longitudinal shaft 21 disposed in the baking chamber 15. The shaft has its ends suitably journaled in bearings 22 located in the end walls of the casing 10. One end of the shaft extends through the wall and has a drive gear 23 secured thereto, which gear is in constant mesh with a pinion 24 driven by a suitable motor 25 (Figure 2). Manifestly, with this arrangement, the shaft and reel may be rotated to revolve the trays within the chamber 15.

The above parts are all of the usual construction and since they have been described merely for the sake of clarity, they are subject to variation.

A firebox 26 is mounted within the baking chamber 15 and extends longitudinally of said chamber, being supported on the bottom 13 of the casing. The firebox includes side walls 27 and end walls 28 which extend upwardly from the bottom 13 and which are secured thereto by angle members 28'. The upper end of the box is open and said box is shown (Figures 1 to 4) as located nearer the rear wall of the baking chamber. However, its particular position within the chamber is subject to variation as it could be located centrally of the chamber, as clearly shown in Figures 5 and 6.

A transversely extending, longitudinal supporting plate 29 is disposed in the lower end of the firebox 25 and a center pilot burner 30 extends upwardly therethrough. This burner is supplied with fuel by a suitable pipe 31 which has its outer end extending through the end wall of the casing 10 (Figure 4) and connected with a supply line 32. Suitable manually operable valves or pet cocks 33 are connected in the pipe 31.

A pair of burners 34 are located one on each side of the pilot burner within the firebox and are supplied with fuel by pipes 35 which lead thereto from a manifold pipe 36, which latter is connected with the supply line 32. Suitable hand valves 37 are connected in the pipes 36. These valves are seldom used as the supply of fuel is controlled by an automatically operated valve 38 which is connected in the manifold pipe 36. The details of this valve are not disclosed as the same may be purchased on the open market. This valve is electrically operated with the electric current thereto being controlled by a thermostat 39 which is mounted on the wall of the casing. When the temperature drops to a predetermined point, the thermostat opens the valve 38 to permit fuel to flow to the burners 34 which are immediately ignited by the pilot burner 30, which latter is constantly burning, being supplied with fuel through the pipe 31 which connects to the supply line 32 beyond the automatic valve 38.

Figure 3:
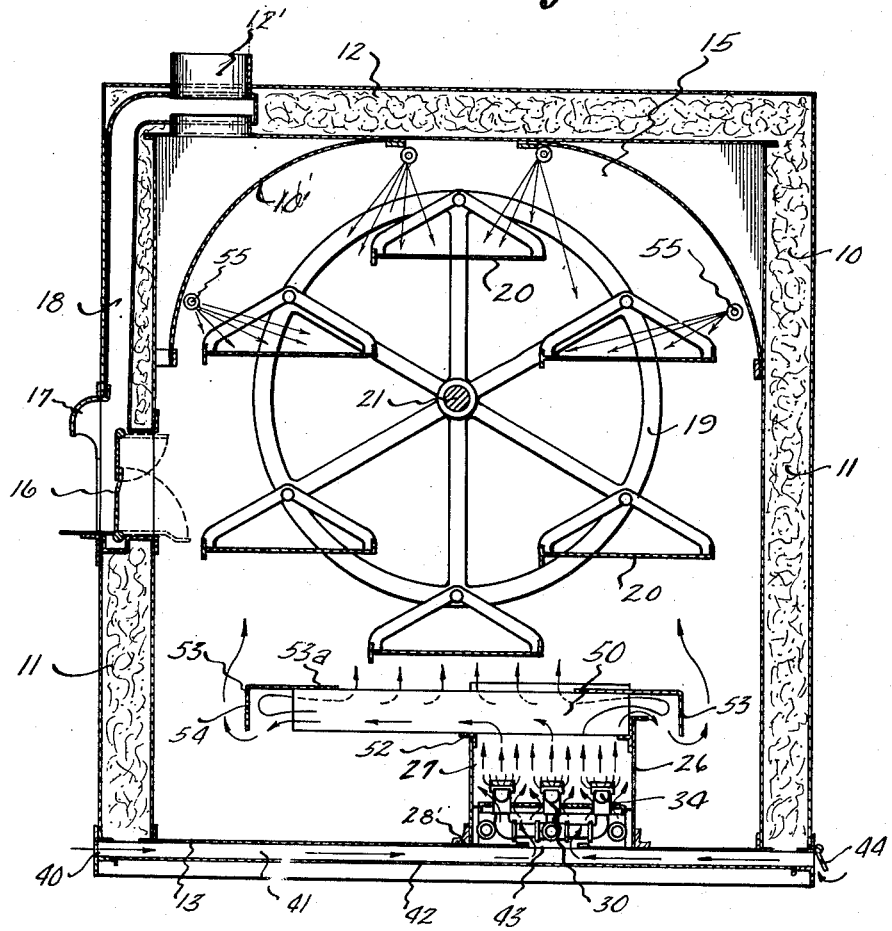
Figure 3 is a transverse, vertical sectional view, taken on the line 3—3 of Figure 2.
Figure 4:
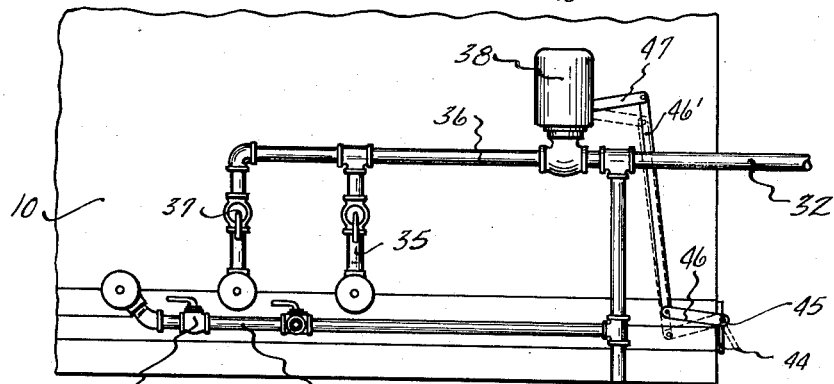
Figure 4 is an elevation of the fuel and air supply control means.

Air is supplied to the burners through a plurality of openings 40 provided in the front vertical leg 14' of the base 14, which permits fresh air to enter a channel 41 formed between the bottom 13 and a transverse partition 42 extending across the interior of said base (Figure 3). From this channel, the air enters the firebox through a longitudinal opening 43 in the bottom 13, whereby air is supplied to the burners. The amount of air passing through the openings 40 is comparatively small and although sufficient for the central pilot burner 30 is not sufficient when the other two burners 34 are ignited. It is not desirable that a sufficient supply of air for all three burners be provided at all times because obviously when the pilot burner 30 is burning alone with the others extinguished, an excess supply of air would be had. Further, if the openings 40 were large enough to provide sufficient air for all three burners and only the pilot burner was burning, a draft would be created through the oven due to a large inlet for fresh air at the lower end of the box. This draft would be set up by the increased air supply flowing from the box upwardly through the oven and out beneath the arcuate ventilating hood 10', which is located within the oven and which communicates with the outlet flue 12' in the top of the casing. This draft of air through the oven would result in an uneven temperature within the baking chamber 15, which might prove injurious to the products being baked. Also, this draft would cause the escape of heat from the baking chamber through the flue and might even extinguish the pilot. Obviously, such draft would also be created by the opening of the door 16. For these reasons, it is advantageous, while the pilot 30 is burning alone, to furnish only sufficient fresh air for that burner.

As has been explained, the other burners 34 are controlled automatically by the valve 38 and thermostat 49. When the valve 38 is actuated fuel is supplied to the burners 34 and therefore, it is necessary that additional air be supplied to the firebox 25 when said burners are lighted. For providing this additional air, a flap valve 44 is adapted to close the rear open end of the air channel 41. This valve is secured on a rotatable shaft 45 which has an arm 46 fastened on one end thereof. This arm is connected by a link 46' with an arm 47 which is an integral part of the structure of the valve 38. When the valve 38 is actuated to admit fuel to the burners 34, the arm 47 thereof is swung to rotate the shaft 45 and swing the valve 44 to its open position, whereby air may enter the channel 41 and pass to the firebox. When the valve 38 is closed to extinguish the burners 34, the valve 44 is of course, swung to its closed position to cut off this additional air supply. With the above arrangement, it will be evident that the air supply to the firebox is increased in accordance with the fuel supplied to the burners 34. The action is entirely automatic, being controlled by the thermostat 39.

For uniformly distributing the heat throughout the baking chamber 15, a longitudinal baffle or hood 50 is mounted above the open upper end of the firebox 25. This baffle extends substantially through the length of the box 25 and is narrower in width than the baking chamber so that its longitudinal edges are spaced from the front and rear walls of said chamber. The baffle is preferably located centrally of the chamber, although it may have the firebox located centrally therebeneath. As clearly shown in Figures 1, 2 and 3, the baffle is formed with angular corrugations throughout its length, whereby transverse passages or channels 51 are provided. The baffle is supported on angle bars 52 (Figure 3) at the upper end of the side walls 38 of the firebox, while the ends of said baffles are secured to the upper end of the end walls 29 of said firebox, the connection at this point being made by bending said walls thereover (Figure 2).

Longitudinal angular deflecting members 53 are located one on each longitudinal edge portion of the baffle. Each deflecting member has its laterally directed portion 53a overlying the edge portion of the baffle, while its vertically extending portion or apron 54 is spaced therefrom. It is preferable that the lower end of each apron 54 be in a plane substantially equal or slightly below the bottom of the baffle.

The baffle completely closes the open upper end of the firebox and thus the heat and other products of combustion pass upwardly from the firebox into the transverse channels or passages 51 formed in the underside of the baffle. So long as said baffle covers the firebox its position with relation thereto is subject to variation. As shown in Figure 2, the firebox is beneath one longitudinal edge portion of the box and the products of combustion rising therefrom enter the channels or passages 51 and travel therealong. Upon reaching the end of said passage, said products will pass beneath the angular deflecting members 53, a portion thereof escaping from beneath the apron 54 of said members. The majority of these products will, however, rise beneath the members 54 and enter the passages or channels 51 formed in the upper side of the baffle 50. From these channels, the products will of course rise in the chamber 15. Manifestly, the baffle acts as a spreader to distribute the products throughout the baking chamber, thus providing a uniform heating and even temperature throughout said chamber. The corrugated baffle further provides an amplified or increased travel path for said products of combustion and also an increased radiating surface is had. The angular corrugations in the baffle also act as deflecting surfaces which radiate the heat in all directions within the chamber, as clearly shown by the arrows $a$ in Figure 2. Therefore, the efficiency of the oven is greatly increased.

In the baking of hearth breads and other bakery products, it is necessary that large quantities of steam be introduced into the baking chamber during the baking process. It has been found that a great deal of trouble is experienced because a large quantity of steam will extinguish the flame of an exposed burner, thereby resulting not only in inefficient baking but also in inconvenience to the baker as a result of having to relight the burner or burners. This disadvantage is overcome in the present structure for manifestly, the baffle 50 completely covers the firebox 25 and protects the burners 30 and 34. The steam is introduced into the baking chamber through suitable nozzles which are located at the upper end of the chamber 15 above the door 16. Any amount of steam desired may be introduced into the chamber without in any way affecting the flame of the burners and therefore, all danger of extinguishing said flame is eliminated.

In Figures 5 and 6, the invention is shown as applied to a stationary or deck type oven. In this form the rotating reel 19 is eliminated and a plurality of decks 56, 56', 59, 60 and 61, are provided one above the other, within the baking chamber. Each deck is composed of a plurality of longitudinal slabs which have their ends supported on angle bars 57 which are fastened to the walls of the oven. The slabs are preferably constructed of refractory material and have their longitudinal edges contiguous to each other. The decks 56 and 56' are formed into trays by securing upwardly extending side walls 58 and 58' respectively thereto. The walls 58 are secured to the deck 56 by angle bars 59a, while the walls 58' are fastened to the deck 56' in a similar manner by angle bars 59'. It is noted that the longitudinal edges of the trays 56 and 56' terminate short of the side walls of the oven to provide a space therebetween. The products to be baked are of course, placed on the trays 56 and 56'.

The deflecting deck 59 is located below the lower tray 56, while the deck 60 is disposed between the trays 56 and 56'. The third deflecting deck is mounted above the upper tray. The longitudinal edges of all of these decks are spaced from the side wall of the oven.

In this type oven, it is desirable in certain instances to conduct the products of combustion directly from the firebox to the space above each tray 56 and 56'. In order to accomplish this a plurality of flues or conductors 62 have their lower ends secured in the aprons 54 of the deflecting members 53. Suitable dampers 63 are arranged to close this lower end of the flues to render the same inoperative.

Each flue extends upwardly through the space between the longitudinal edges of the decks 59 and 56' and has its extreme upper end directed inwardly between the tray 56' and the deck 60. When the dampers 63 are open, a portion of the products of combustion are conducted upwardly and pass out from the open ends of the flues, whereby the upper tray 56' and the deck 60 are heated. The lower deck 56 is of course heated by the products of combustion rising from the firebox, as has been explained in the first form.

After escaping from the flues 62, a portion of the heat and other products of combustion are absorbed by the tray 56' and deck 60 to heat the tray and deck, while the remainder thereof pass outwardly therebetween toward the sides of the oven as indicated by the arrows in Figure 6. The heat then rises upwardly toward the uppermost deck 61. If it is desired to trap the heat above the upper tray 56', dampers 64 at the longitudinal edge portions of the upper deck 61 are closed, which causes the heat to be directed over the upper tray. Opening of the dampers 64 will, of course, permit escape of the heat to the outlet flue 18' in the top of the oven. Thus a positive control of the direct heating of the top of the trays 56 and 56' may be had. When the dampers 62 and 63 are closed, the baffle 50 will conduct the products of combustion in exactly the same manner as in the first form, the flues being inoperative. It is noted that in Figures 5 and 6, the firebox is located centrally beneath the baffle 50 whereas in Figure 1, said box is nearer one end of said baffle. In both forms, however, the uniform distribution of heat throughout the baking chamber is accomplished, which results in increased baking efficiency.

What I claim and desire to secure by Letters Patent is:

1. A baking oven including, a baking chamber, a firebox within said chamber for heating the same, and a longitudinally extending baffle disposed above said firebox and having a width less than the width of the chamber for distributing the products of combustion uniformly throughout the chamber.

2. A baking oven including, a baking chamber, a firebox within said chamber for heating the same, a longitudinally extending baffle disposed above said firebox and having a width less than the width of the chamber for distributing the products of combustion uniformly throughout the chamber, and angular transverse corrugations throughout the length of the baffle forming transverse channels for conducting said products from the firebox.

3. A baking oven including, a baking chamber, a firebox having an open upper end within said chamber, a burner within said firebox, and a longitudinal baffle closing the upper end of the firebox and extending beyond the side thereof and being arranged so as to direct the products of combustion from the box toward the walls of the chamber, whereby the chamber is uniformly heated throughout.

4. A baking oven including, a baking chamber, a firebox having an open upper end within said chamber, a burner within said firebox, a longitudinal baffle closing the upper end of the firebox and extending beyond the side thereof and being arranged so as to direct the products of combustion from the box toward the walls of the chamber, whereby the chamber is uniformly heated throughout, and means for introducing steam into said chamber, the baffle also acting to protect the flame of said burner from the steam, whereby extinguishing of the burner by the introduction of large quantities of steam into the chamber is prevented.

5. A baking oven including, a baking chamber, a firebox having an open upper end within said chamber, a burner within said firebox, and a longitudinal baffle closing the upper end of the firebox and extending beyond the longitudinal side of said firebox and having transverse passages on its underside for conducting the products of combustion from the firebox toward the wall of the chamber, the longitudinal edges of the baffle terminating short of said walls of the chamber.

6. A baking oven including, a baking chamber, a firebox having an open upper end within said chamber, a burner within said firebox, a longitudinal baffle closing the upper end of the firebox and having angular corrugations throughout its length whereby transverse channels are formed on the top and bottom of the baffle, the lower channels acting to conduct the products of combustion to the longitudinal edges of the baffle, and means for directing the products into the top channels to permit their escape into the baking chamber.

7. A baking oven including, a baking chamber, a firebox in the lower end of said chamber, a deflecting member extending substantially throughout the length of the firebox and having a width greater than said firebox for spreading and distributing the products of combustion uniformly throughout the chamber.

8. A baking oven including, a casing having a baking chamber therein, a firebox at the lower end of said chamber, a pilot burner within the firebox, means for constantly supplying said burner with fuel and air, a second burner within the firebox, means for supplying fuel to said second burner, and means for admitting additional air to the firebox when the second burner is ignited.

9. A baking oven including, a casing having a baking chamber therein, a firebox at the lower end of said chamber, a pilot burner within the firebox, means for constantly supplying said burner with fuel and air, a second burner within the firebox, means for supplying fuel to said second burner, means for admitting additional air to the firebox when the second burner is ignited, and means for automatically controlling the fuel supply to the second burner and for supplying the additional air to the firebox simultaneously.

10. A baking oven including, a baking chamber, a supporting shelf for receiving products to be baked within said chamber, a firebox in the lower end of said chamber, a longitudinal baffle disposed above the firebox for directing the products of combustion toward the walls of the chamber to permit them to rise beneath the shelf, and means for conducting said products of combustion from beneath the baffle to a point above said shelf.

11. A baking oven including, a baking chamber, a supporting shelf for receiving products to be baked within said chamber, a firebox in the lower end of said chamber, a longitudinal baffle disposed above the firebox for directing the products of combustion toward the walls of the chamber to permit them to rise beneath the shelf, means for conducting said products of combustion from beneath the baffle to a point above said shelf, and means for controlling the passage of said products of combustion through the conducting means to render the same inoperative and thereby cause all of the products of combustion to pass upwardly from the baffle.

12. A baking oven including, a baking chamber, a pair of trays within the chamber disposed one above the other for receiving products to be baked, a firebox in the lower end of said chamber, a longitudinal baffle located above the firebox and having a greater width than the firebox for directing the products of combustion toward the walls of the chamber to permit them to rise beneath the lowermost tray, means for conducting the products from the box to a point between the trays and also for conducting said products above the upper tray, whereby uniform baking is accomplished, and means for controlling the passage of said products of combustion through the conducting means to render the same inoperative and thereby cause all of the products of combustion to pass upwardly from the baffle.

13. A baking oven including, a baking chamber, a firebox within said chamber for heating the same, and means disposed above said firebox and including elongated horizontal channels and baffles at the ends of said channels for diverting the products of combustion.

14. A baking oven including, a baking chamber, a firebox within said chamber for heating the same, means disposed above said firebox and including elongated horizontal channels and baffles at the ends of said channels for diverting the products of combustion, and means for causing a return flow of said products through a portion of said channels.

15. A baking oven including, a baking chamber, a firebox within said chamber for heating the same, and an undulating imperforate baffle overhanging the firebox and extending beyond the longitudinal sides of said firebox and having channels for distributing the products of combustion uniformly throughout the chamber.

16. A baking oven including, a baking chamber, a firebox within said chamber for heating the same, and an undulating imperforate baffle overhanging the firebox and extending beyond the longitudinal sides of said firebox and having elongate channels for causing a transverse flow of the products of combustion to distribute said products throughout the chamber.

LOUIS D. HOULIS.